June 17, 1969

D. R. GEOFFROY 3,450,339

DIFFUSER FOR A BLOWER

Filed June 8, 1967

Inventor
David R. Geoffroy
By Charles R. Fay,
Attorney

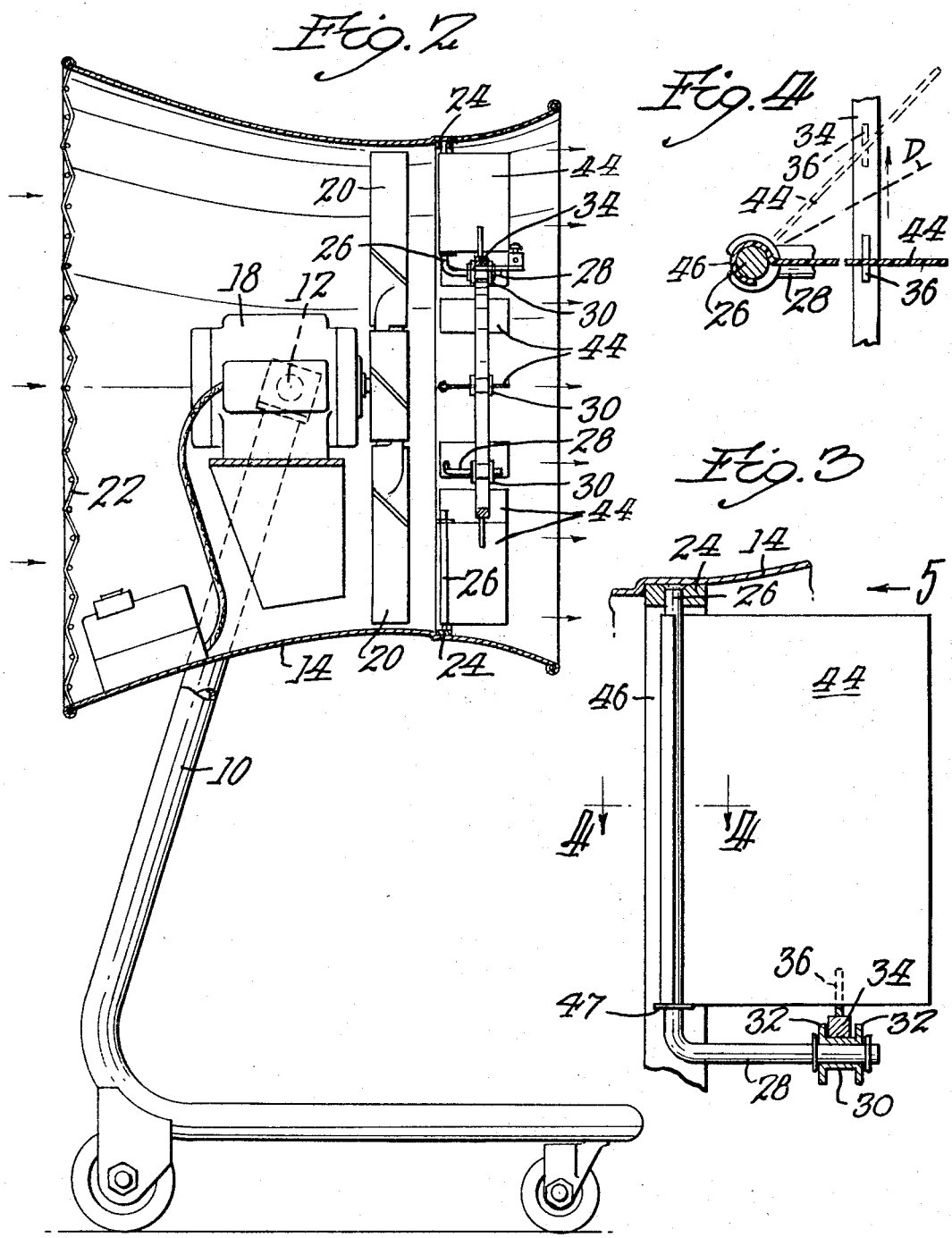

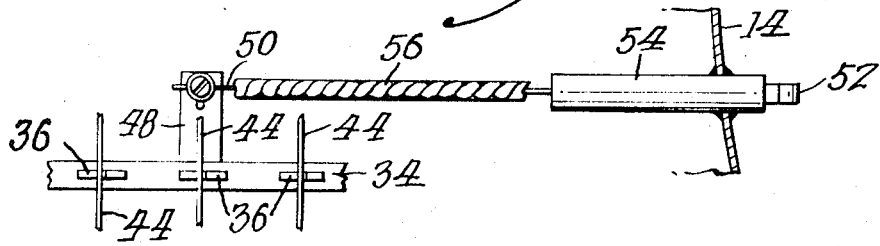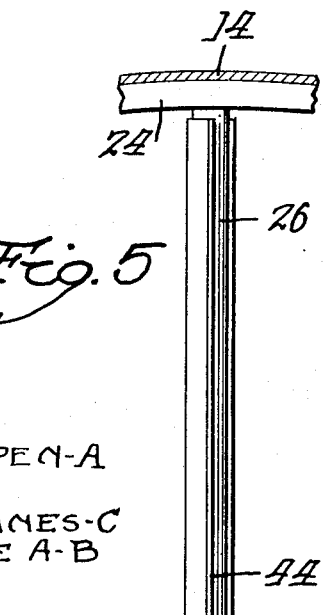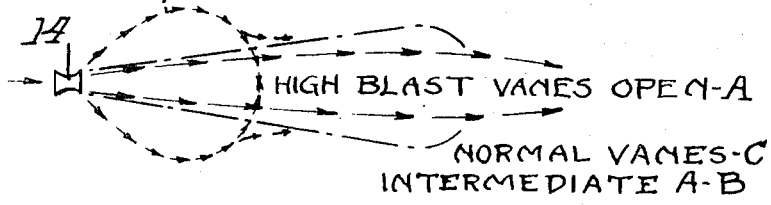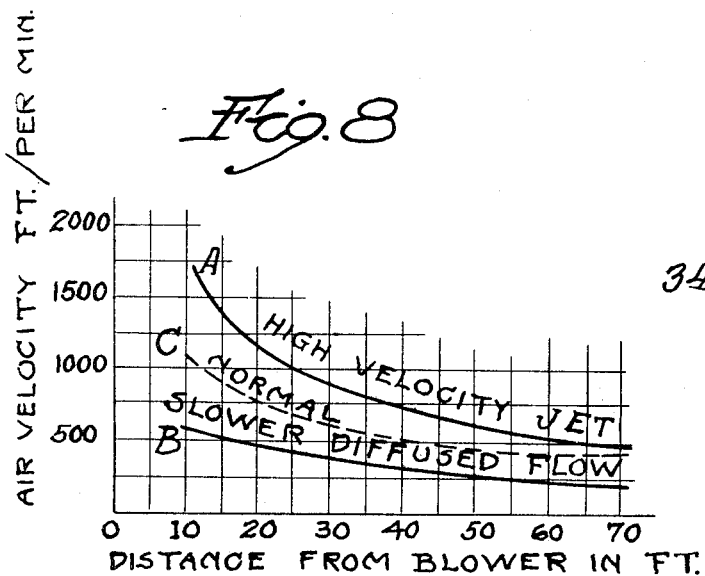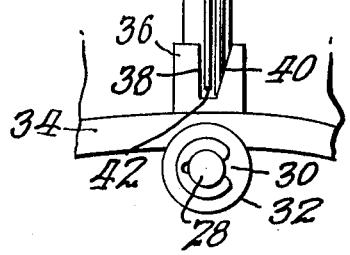

United States Patent Office 3,450,339
Patented June 17, 1969

3,450,339
DIFFUSER FOR A BLOWER
David R. Geoffroy, Auburn, Mass., assignor to Coppus Engineering Corporation, Worcester, Mass., a corporation of Massachusetts
Filed June 8, 1967, Ser. No. 644,706
Int. Cl. F04d 29/56
U.S. Cl. 230—274                                                     7 Claims

ABSTRACT OF THE DISCLOSURE

A blower having a casing normally directing a relatively high velocity stream of air along a relatively narrow path and including means in the form of adjustable vanes for selectively condensing the stream to a narrower path at a higher velocity or diffusing the blast of air to a more gentle breeze which is widespread. In general, the amount of air is not changed, only the velocity. The vanes are provided with means for simultaneous adjustment.

---

There are many examples of fans or blowers having vanes to adjust the volume of air discharged, from for instance a 100% flow to a shut-off condition. The present invention does not have this purpose and does not provide shut-off means, but diffuses or condenses a stream of air relative to a normal condition.

This invention relates to a novel device for varying the stream of air from a blower normally used to disperse heat under a fixed condition. Such blowers are used for the dispersion of heat mainly in industrial relationships where a worker must be located at a hot spot, e.g. adjacent a furnace. A relatively high speed stream of air is directed on the worker, and is very useful for reducing the heat and allowing the operator to work in more comfort.

However at times the heat is less intense and the operator would then prefer not to work directly in the blast of air but the only alternative is to turn off the fan or to direct the blast of air in another direction, neither course being practicable inasmuch as the blast of air would not be wanted by others and the general atmosphere is still heated. Also, a worsened condition of heat calls for a higher velocity to achieve relative comfort.

The present invention accomplishes the solution of the problem by providing a series of vanes having a very simple adjustment for turning the same to various angles with respect to the axis of the stream of air, and then the same fan at the same speed blows the same amount of air but at a different velocity in a much wider or narrower range, thus selectively providing a gentle breeze or a greater and more direct blast.

Other objects and advantages of the invention will appear hereinafter.

Reference is to be had to the accompanying drawings in which:

FIG. 2 is a section on line 2—2 of FIG. 1;

FIG. 3 is a view in elevation with parts in section and on an enlarged scale illustrating the mounting of one of the vanes;

FIG. 4 is a section on line 4—4 of FIG. 3 and illustrating the inclination of the vane from a direction parallel to the axis of the blast to positions inclined with respect thereto;

FIG. 5 is a view in elevation looking in the direction of arrow 5 in FIG. 3, and on a still larger scale;

FIG. 6 is a plan view showing the mechanism for actuating the vanes;

FIG. 7 is a diagram illustrating the three main conditions of air velocity afforded by the invention, and FIG. 8 is a chart illustrating the effect thereof.

Figure 1:
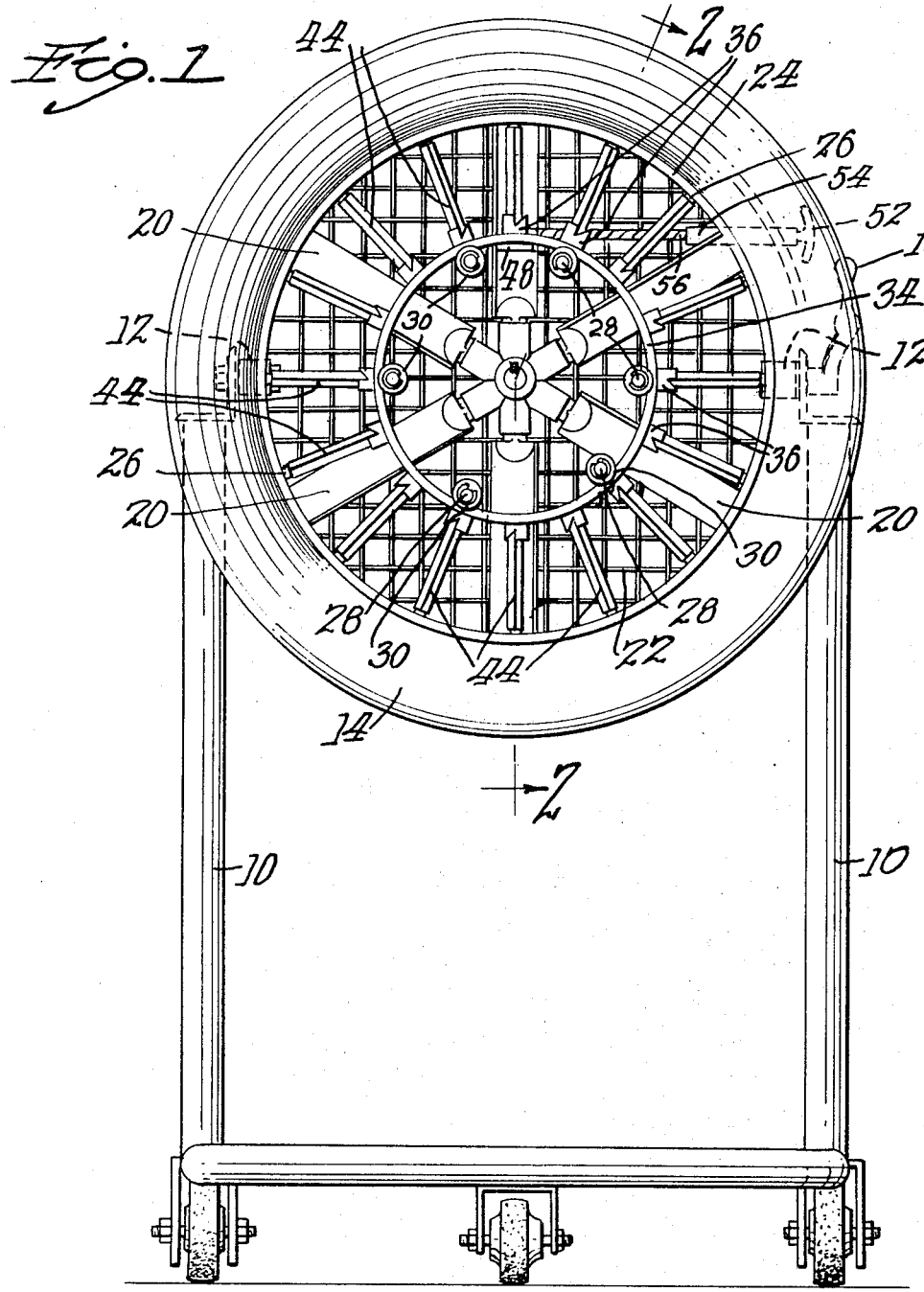
FIG. 1 is a view in front elevation of a blower illustrating the novel vanes directed in parallel to the axis of the blast of air derived from the fan.

Referring to FIGS. 1 and 2, it will be seen that there is preferably provided a simple stand or the like 10 having a pair of uprights on which may be mounted trunnions 12, 12 supporting a fan casing generally indicated at 14 and if desired there may be provided a handle 16 for adjusting the angle of the casing for changing the angle of the blast of air. The stand may be mounted on wheels or the like so that it is made more easily mobile.

As better shown in FIG. 2, there is provided a motor 18 supported e.g. on the trunnions in the fan casing and mounting and driving a fan 20. Appropriate guard wires 22 may be placed fore-and-aft if desired to both protect the fan and protect operators.

The fan casing 14 is well known and produces an appropriate relatively high velocity stream of air which is elongated and relatively narrow to encompass an area which is to be cooled, see FIG. 7, at the area labeled "Normal."

Interiorly of the fan casing there is a frame ring 24 mounted thereon in any convenient manner. The casing itself is preferably circular in section and thus the frame ring is preferably annular. On the frame ring there are provided as for instance by welding or other means a series of like pins or rods 26 extending radially inwardly to a circle well short of the center of the fan casing as is clearly shown in FIGS. 1 and 2. These pins or rods terminate in right-angled bent members 28 at the ends of which are properly mounted spools 30, one for each such bent arm 28, see FIG. 3. These spools are provided with end flanges 32. It is pointed out that there need not be provided a spool 30 for each arm 28, and as a matter of fact it is preferred to provide each alternate rod 26 with such an inturned arm 28 and flanged spool.

The spools 30 mount an annular actuator hoop 34 so that it can oscillate in a rotary manner and on this hoop there are provided a series of vane clips 36 perhaps best shown in FIG. 5. Each vane clip is provided with a notch having a straight side 38 and an inclined edge 40 and the lower edge portion as at 42 of each vane 44 rides in this notch and is moved by the respective clip as will be hereinafter explained. Each vane 44 is journaled on its respective rod 26 and this is conveniently done e.g. by means of a rolled edge portion 46 on the vane which substantially encompasses its respective rod. The vanes may be supported in any way, and rings 47 may be attached to rods 26 for this purpose.

On the actuator hoop 34 there is provided an actuator arm, see FIG. 6, this being indicated at 48, and to this arm there is attached by any desired means a relatively stiff push-pull wire or cable 50 under control of a handle 52 mounted in a slide arrangement 54 on the fan casing 14. The wire 50 has a protective sheath 56, and is located at a tangent to the hoop 34.

The purpose of this wire is to oscillate the actuating hoop 34 to a limited extent so as to bring the vanes from the straightforward position of FIGS. 1 and 5 to an inclined position. This is achieved by means of the clips 36 which engage the lower edges of the vanes at points remote from the pivot axes thereof in the rods 26. A full throw of the tangential wire, i.e., from one limit of motion to the other, accomplishes this range of adjustment of the vanes.

When the handle at 52 is moved in the appropriate direction, the vanes will be moved with it. With the vanes in the solid line position of FIG. 4 and as shown in FIGS. 1 and 5, i.e., parallel to the axis of the casing 14, the stream of air is found to greatly accelerate and elongate to a substantially pin-pointed blast. When the handle is actuated so as to move the actuator 34 in the proper direction to its extreme, the vanes will all be tilted or inclined e.g. approximately 45° with respect to the casing axis on the rods 26, thus directing a major portion of the stream of air out to the sides.

This action is illustrated diagrammatically in FIG. 7. An operator standing in the narrow elongated area A in FIG. 7 will be under a high velocity jet when the vanes are straight, i.e., in the FIG. 1 condition thereof, but merely upon actuation of the handle in the proper manner, a gentle breeze in area B will be provided so that the operator no longer needs to work in the blast when he does not want it, but on the other hand it is immediately once more available merely by manipulation of the handle 52 in the opposite direction. At the same time a modified cooling action is provided as the air tends to return toward the stream axis as indicated by the arrows in area B.

The above describes the extremes of velocity provided by the invention, but it also is found that by placing the vanes in an intermediate position as at D in FIG. 4, the normal air stream and air velocity are provided, approximating the condition of the air stream had the novel vane apparatus not been applied to the blower. This is indicated at C in FIG. 7, as the "Normal" air stream condition.

As an example of the three conditions defined, the jet A at about ten feet from the blower will have a velocity of about 1800 feet per minute and a maximum lateral angle of from 5° to 8° relative to the axis; the diffused breeze B has about 500 plus feet per minute velocity and a maximum angle of 15 to 22°; and the normal stream, either without the vanes at all or with the vanes at about a midway inclination, has about 1050 feet per minute and a lateral angle of 10°–15°. These velocities are shown in the chart in FIG. 8, and the relationship of the angles is indicated in FIG. 7.

The chart in FIG. 8 also illustrates the general effect at various distances from the blower with relation to the air velocity in feet per minute. It will be seen that the air flow is not changed but only the velocity.

Having thus described my invention and the advantages thereof, I do not wish to be limited to the details herein disclosed, otherwise than as set forth in the claims, but what I claim is:

1. A blower comprising a fan, a fan casing therefor directing a normal stream of air from the fan through a relatively narrow, elongated path in a free atmosphere, a series of movable vanes adjacent the fan and in the fan casing, and means to position the vanes selectively parallel to the axis of the normal air stream or at a variable inclination thereto, the air stream being reduced in velocity and diffused in the inclined position of the vanes relative to the normal stream, and concentrated with a narrower stream at a higher velocity with the vanes parallel to said axis, the vanes being located to extend from adjacent the periphery of the fan inwardly to a terminal point intermediate the length of the radius of the fan.

2. The blower of claim 1 wherein the vanes are generally radial.

3. A blower construction comprising a fan, a casing surrounding the fan, said casing being constructed and arranged to direct a stream of air from the fan in a normal elongated relatively high velocity stream in an open atmosphere, a series of movable vanes adjacent the fan and located in the fan casing and arranged in an annular relationship over the entire fan to affect the stream of air therefrom, and means to position the vanes selectively parallel to the axis of the air stream or at a maximum inclination with respect thereto, the air stream being increased in velocity and elongation with the vanes parallel to the axis and being reduced in velocity and diffused in the said inclined position of the vanes, and said normal stream being provided by an inclination of the vanes, relative to the axis substantially midway between the maximum inclination as aforesaid and the parallel position thereof.

4. A blower comprising a bladed fan, a fan casing therefor, and a series of mutually spaced vanes arranged at the pressure side of the fan, means pivotally mounting the vanes on generally radial axes, and means to pivot the vanes comprising an comprising an elongated member, a series of clips on the member engaged with respective vanes in offset position relative to the radial axes thereof, and means to shift the member in the direction of its length to a limited degree.

5. The blower of claim 4 wherein the support is substantially annular and concentric with the fan.

6. The blower of claim 4 wherein the support is substantially annular and concentric with the fan and the vanes are located between the support and the fan casing.

7. A blower comprising a fan having a blade and a motor for rotating the same, a fan casing for the fan constructed and arranged to produce an elongated relatively high velocity stream of air, a series of radial vanes arranged at the pressure side of the fan, means pivotally mounting the vanes on radial axes relative to the fan, and means to pivot the vanes between positions parallel to the general axis of the air blast to positions at an inclination with respect thereto, said means comprising a support, loosely interengaging clips on the support, each clip being engaged with respect to a vane at a point spaced from the pivot axis thereof, means to move the support to move the clips and thereby move the vanes on their axes to an inclined position relative to the axis of the stream of air causing a major portion of the air to be diffused, the vanes having a radial length less than one-half the diameter of the fan and being arranged from the periphery of the fan inwardly toward the center thereof.

References Cited

UNITED STATES PATENTS

| | | |
|---|---|---|
| 1,822,672 | 9/1931 | Schick. |
| 3,128,036 | 4/1964 | McBride _____ 230—274 X |
| 2,124,716 | 7/1938 | Sperry _____ 230—274 |

FOREIGN PATENTS 438,345  11/1935  Great Britain.

LEONARD H. GERIN, *Primary Examiner.*